(12) United States Patent
Son et al.

(10) Patent No.: US 9,920,997 B2
(45) Date of Patent: Mar. 20, 2018

(54) COOLING APPARATUS AND SYSTEM INCLUDING THE SAME

(71) Applicant: Samsung Electronics Co., Ltd., Suwon-si, Gyeonggi-do (KR)

(72) Inventors: Han-Soo Son, Hwaseong-si (KR); Seong-Dai Jang, Seongnam-si (KR); Jae-Yong Kim, Hwaseong-si (KR); Kyung-Bae Min, Gumi-si (KR); Kwang-Sin Lee, Suwon-si (KR); Jung-Ja Lee, Suwon-si (KR); Chang-Ju Byun, Yongin-si (KR); Ho-Nam Jung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 281 days.

(21) Appl. No.: 14/645,870

(22) Filed: Mar. 12, 2015

(65) Prior Publication Data

US 2015/0276292 A1 Oct. 1, 2015

(30) Foreign Application Priority Data

Mar. 25, 2014 (KR) .................. 10-2014-0034662
Jul. 2, 2014 (KR) .................. 10-2014-0082553

(51) Int. Cl.
*F25C 1/00* (2006.01)
*F28C 1/00* (2006.01)

(52) U.S. Cl.
CPC .......... *F28C 1/00* (2013.01); *F28C 2001/006* (2013.01)

(58) Field of Classification Search
CPC ........ F28C 1/00; F28C 2001/006; F28C 1/14; F28C 1/16; F28B 1/06; F28B 5/00; F28D 9/0037; F28D 5/00; F24F 5/0035; F24F 2001/0092; F25B 13/00; F25B 2400/06; F25D 16/00; F25D 17/02; F01C 21/02; F04C 18/3564; F04C 2240/403;
(Continued)

(56) References Cited

U.S. PATENT DOCUMENTS 3,831,667 A * 8/1974 Kilgore .................. F01K 9/003
165/110
4,419,864 A * 12/1983 McFarlan ............. F25B 29/003
62/159
(Continued)

FOREIGN PATENT DOCUMENTS

JP H08-145597 A 6/1996
JP H09-264676 A 10/1997
(Continued)

*Primary Examiner* — Dominick L Plakkoottam
*Assistant Examiner* — Melodee Jefferson
(74) *Attorney, Agent, or Firm* — Harness, Dickey & Pierce, P.L.C.

(57) ABSTRACT

Cooling apparatuses and a system including the same may be provided. The cooling apparatus including a freezer, a first cooling unit configured to cool a first cooling water supplied to the freezer in open air, and a second cooling unit configured to cool a second cooling water supplied to the first cooling unit may be provided. According to a temperature difference between the open air and the first cooling water, the second cooling unit may circulate the second cooling water separately with respect to the first cooling water or mix the second cooling water into the first cooling water.

13 Claims, 6 Drawing Sheets

(58) Field of Classification Search
CPC .... F04C 23/001; F04C 23/008; F04C 28/065; F04C 28/08; F04C 29/04; Y10S 165/90; Y10S 261/11; Y10S 165/182
See application file for complete search history.

(56) References Cited

U.S. PATENT DOCUMENTS

| | | | |
|---|---|---|---|
| 5,970,729 A * | 10/1999 | Yamamoto | F25D 16/00 165/80.4 |
| 6,216,486 B1 * | 4/2001 | Aaron | F25D 16/00 165/10 |
| 7,128,310 B2 | 10/2006 | Mockry et al. | |
| 8,966,924 B2 * | 3/2015 | Pichai | F28C 1/14 62/310 |
| 2008/0087027 A1 * | 4/2008 | Park | F01C 21/02 62/81 |
| 2009/0019874 A1 * | 1/2009 | Park | F24F 1/00 62/259.1 |
| 2010/0077776 A1 * | 4/2010 | Takenami | F24F 11/0009 62/98 |
| 2011/0138839 A1 * | 6/2011 | Lee | F25B 13/00 62/324.5 |

FOREIGN PATENT DOCUMENTS

| | | | |
|---|---|---|---|
| JP | 2000-088475 A | | 3/2000 |
| JP | 2012072921 A | * | 4/2012 |
| KR | 10-0375555 B1 | | 3/2003 |
| KR | 20070112590 A | * | 11/2007 |
| KR | 10-1093812 B1 | | 12/2011 |
| KR | 10-1102827 B1 | | 1/2012 |
| KR | 10-1173297 B1 | | 8/2012 |
| KR | 10-1197283 B1 | | 11/2012 |
| KR | 101255590 B1 | * | 4/2013 |
| KR | 10-1357243 B1 | | 1/2014 |

* cited by examiner

COOLING APPARATUS AND SYSTEM INCLUDING THE SAME

CROSS-REFERENCE TO RELATED APPLICATIONS

This U.S. non-provisional patent application claims priority under 35 U.S.C. § 119 of Korean Patent Application No. 10-2014-0034662, filed on Mar. 25, 2014, and Korean Patent Application No. 10-2014-0082553, filed on Jul. 2, 2014, the entire contents of which are hereby incorporated by reference.

BACKGROUND

The present disclosure herein relates to cooling apparatuses, and more particularly, to cooling apparatuses and/or systems including the same capable of cooling a cooling water without generating white smoke.

A cooling tower is widely used in air conditioning equipment, industrial equipment, buildings and so on. The cooling tower may cool cooling water through the atmospheric air. The air exhausted from the cooling tower is relatively hot and humid, and thus is mostly in a saturated vapor state. Therefore, white smoke is frequently generated from the cooling tower, for example, during winter. White smoke may be generated, for example, when a temperature of the cooling water is higher than that of atmospheric air. The generation of the white smoke may incur civil complaints for visual pollution and interruption of sunshine.

SUMMARY

The present disclosure provides cooling apparatuses and/or a manufacturing system including the same capable of preventing white smoke.

According to an example embodiment, a cooling apparatuses includes a freezer, a first cooling unit configured to cool first cooling water supplied to the freezer in open air; and a second cooling unit configured to cool second cooling water supplied to the first cooling unit, wherein according to a temperature difference between the open air and the first cooling water, the second cooling unit is configured to one of circulate the second cooling water independently from the first cooling water and mix the second cooling water with the first cooling water.

According to an example embodiment, a system including the above cooling apparatus includes a housing having a lower region and an upper region, process equipment disposed in the upper region of the housing, and a cooling apparatus configured to cool a process cooling water supplied to the process equipment, wherein the cooling apparatus includes a freezer in the lower region of the housing, a first cooling unit disposed outside the housing and configured to cool a first cooling water supplied to the freezer in open air, and a second cooling unit disposed outside the housing and configured to cool a second cooling water supplied to the first cooling unit, wherein according to a temperature different between the open air and the first cooling water, the second cooling unit configured to one of circulate the second cooling water separately from the first cooling water and mix the second cooling water with the first cooling water.

According to an example embodiment, a cooling apparatuses include a freezer, a first cooling unit configured to cool a first cooling water supplied to the freezer in open air, and a second cooling unit configured to cool a second cooling water supplied to the first cooling unit, wherein the first cooling water and the second cooling water are separately circulated when the temperature difference is equal to or greater than about 12° C. and the first cooling water and the second cooling water are mixed when the temperature difference is equal to or less than about 12° C.

According to an example embodiment, a cooling apparatus includes a freezer, a first cooling unit configured to cool first cooling water supplied to the freezer in open air, and a second cooling unit configured to cool second cooling water supplied to the first cooling unit, the second cooling unit configured to one of exchange heat between the first cooling water and the second cooling water in an unmixed manner, and mix the second cooling water with the first cooling water based on a temperature difference between the open air and the first cooling water.

BRIEF DESCRIPTION OF THE DRAWINGS

The accompanying drawings are provided a further understanding of the example embodiments, and are incorporated herein to constitute a part of this disclosure. The drawings illustrate some example embodiments and, together with the description, serve to explain principles of the example embodiments. In the drawings.

DETAILED DESCRIPTION

Figure 1:
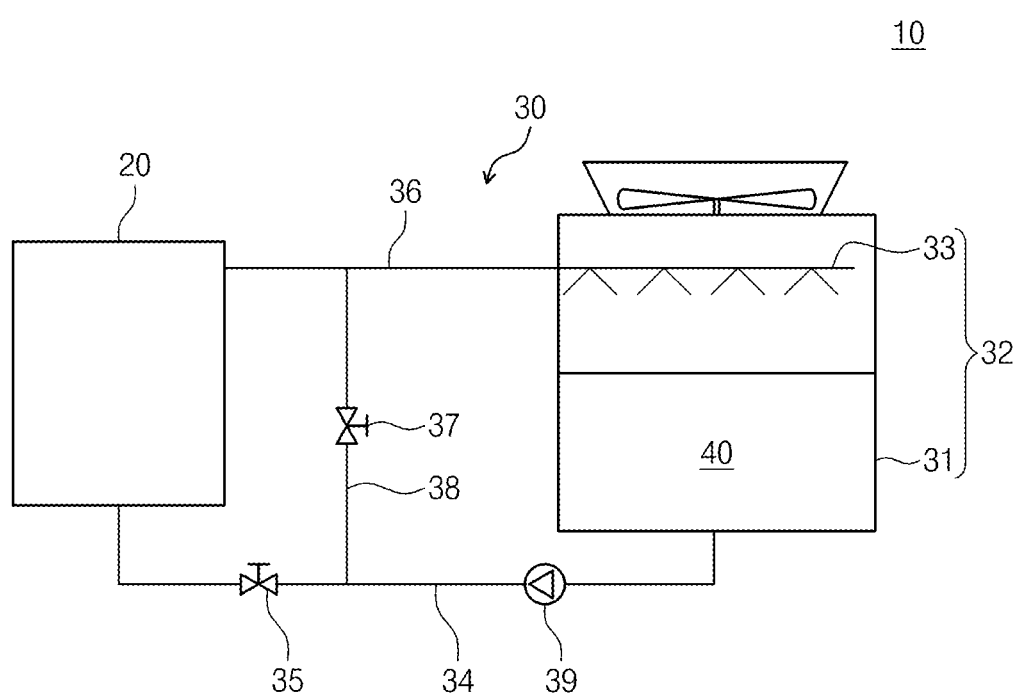
FIG. 1 is a view illustrating a typical cooling apparatus.

Advantages and features of the inventive concepts, and implementation methods thereof will be clarified through following example embodiments described with reference to the accompanying drawings. The inventive concepts may, however, be embodied in different forms and should not be construed as limited to the example embodiments set forth herein. Rather, these example embodiments are provided so that this disclosure will be thorough and complete, and will fully convey the scope of the inventive concepts to those skilled in the art. Further, the inventive concepts are only defined by scopes of claims. In the drawings, like reference numerals refer to like elements throughout.

It will also be understood that when a valve and a temperature sensor are referred to as being 'on' a line, it can be directly on the line or be connected between lines. Also, though terms like a first and a second are used to describe various types and processes of associated materials in various example embodiments, the regions and the layers are not limited to these terms. These terms are used only to discriminate any specific material or process from another material or process, and the inventive concepts are not limited to these terms.

In the following description, the technical terms are used only for explaining a specific example embodiment while not limiting the inventive concepts. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Additionally, the example embodiment in the detailed description will be described with sectional views and/or plain views as ideal example views of the inventive concepts. In the figures, the dimensions of layers and regions are exaggerated for clarity of illustration. Accordingly, shapes of the example views may be modified according to manufacturing techniques and/or allowable errors. Therefore, example embodiments of the inventive concepts are not limited to the specific shape illustrated in the example views, but may include other shapes that may be created according to manufacturing processes.

FIG. 1 is a view illustrating a typical cooling apparatus. A typical cooling apparatus 10 may include a freezer 20 and a cooling unit 30.

The freezer 20 may cool an object to be cooled by and through heat exchange or evaporation heat. For example, the freezer 20 may include a heat exchange device, a cooling device, an air conditioner, or a refrigerator. The freezer 20 may use cooling water 40 as a refrigerant. The cooling water 40 may absorb heat of the freezer 20.

The cooling unit 30 may collect the heated cooling water 40 from the freezer 20. The cooling water 40 may be cooled in the cooling unit 30. The cooling unit 30 may re-supply the cooled cooling water 40 to the freezer 20. The cooling water 40 may be circulated between the freezer 20 and the cooling unit 30. For example, the cooling unit 30 may include a cooling tower 32, a cooling water supply line 34, a cooling water collection line 36, and a cooling water bypass line 38, and a cooling water pump 39.

The cooling tower 32 may cool the cooling water 40 in the atmospheric air. Herein, the atmosphere may correspond to an external environment of the object to be cooled. The atmospheric air is defined as open air. A temperature of the cooling water 40 may be higher than that of the open air. The cooling tower 32 may include a cooling water storage tank 31 and a cooling water sprinkler 33. The cooling water sprinkler 33 may sprinkle the cooling water 40 over the open air on the cooling water storage tank 31. The cooling water 40 may be cooled by air. The cooling water storage tank 31 may temporarily store the sprinkled cooling water 40.

Each of the cooling water supply line 34 and the cooling water collection line 36 may connect the freezer 20 and the cooling tower 32. The cooling water 40 may be circulated through the cooling water supply line 34 and the cooling water collection line 36.

The cooling water pump 39 may apply pressure for circulating the cooling water 40. The cooling water pump 39 may be disposed on the cooling water supply line 34. Circulation flux of the cooling water 40 may be adjusted by a cooling water adjustment valve 35. The cooling water adjustment valve 35 may be disposed on the cooling water supply line 34.

The cooling waters 40 in the cooling water supply line 34 and the cooling water collection line 36 may have different temperatures from each other. For example, the cooling water 40 in the cooling water collection line 36 may have a higher temperature than that in the cooling water supply line 34. At this time, when the temperature of the cooling water 40 is excessively higher than that of the open air, white smoke may be generated in the cooling tower 32. The white smoke may be mainly generated in the winter season.

Figure 2:
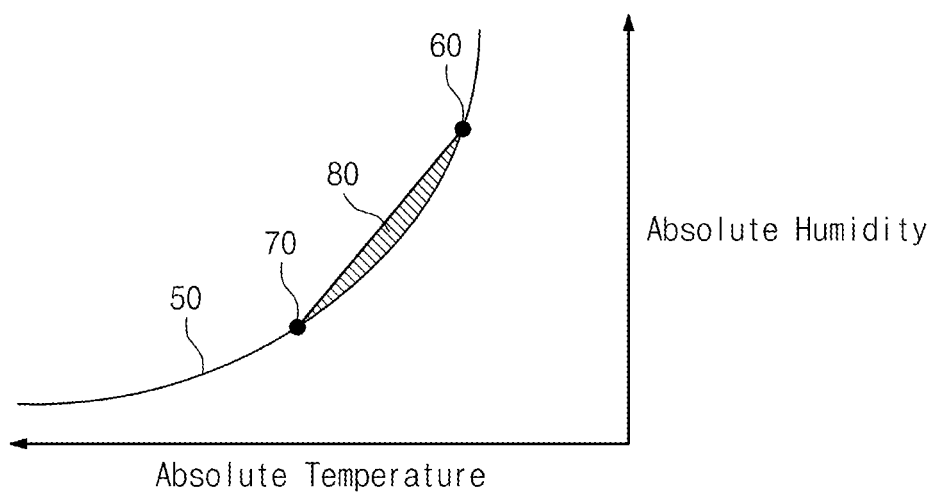
FIG. 2 is a graph showing a saturation vapor pressure curve.

FIG. 2 shows a saturation vapor pressure curve 50 for describing a white smoke phenomenon. A straight line "60-70" indicates a phase change of air exhausted from the cooling tower 32 in the winter season. The cooling water 40 may have an excessively higher temperature than the open air in winter season. The cooling water 40 may be massively vaporized in the air. An amount 80 of the vapor may be indicated by an area defined by the saturation vapor pressure curve 50 and the straight line 60-70. The white smoke of vapor of the cooling water 40 may be generated from the cooling tower 32. For example, the white smoke may be generated when the temperature of the cooling water 40 is, for example, about 12° C. higher than that of the open air.

Referring to FIG. 1, the cooling water bypass line 38 may connect the cooling water supply line 34 and the cooling water collection line 36. The cooling water bypass line 38 may allow the cooling water 40 to bypass around the freezer 20 for circulation. A cooling water bypass adjustment valve 37 may be disposed on the cooling water bypass line 38. The cooling water bypass adjustment valve 37 and the cooling water circulation adjustment valve 35 may adjust the flux of each of the cooling waters 40 supplied to the freezer 20 and the cooling water bypass line 38, respectively. The cooling water 40 treated in the freezer 20 and the cooling water 40 cooled in the cooling tower 32 may be mixed with each other in the cooling water collection line 36. The temperature of the cooling water 40 may be controlled so as to have a temperature difference of, for example, less than about 12° C. from that of the open air. Therefore, the typical cooling apparatus 10 may reduce the white smoke.

Nevertheless, because most of the cooling water 40 cooled in the cooling tower 32 may be supplied to the cooling water bypass line 38, cooling efficiency of the freezer 20 may be reduced.

Figure 3:
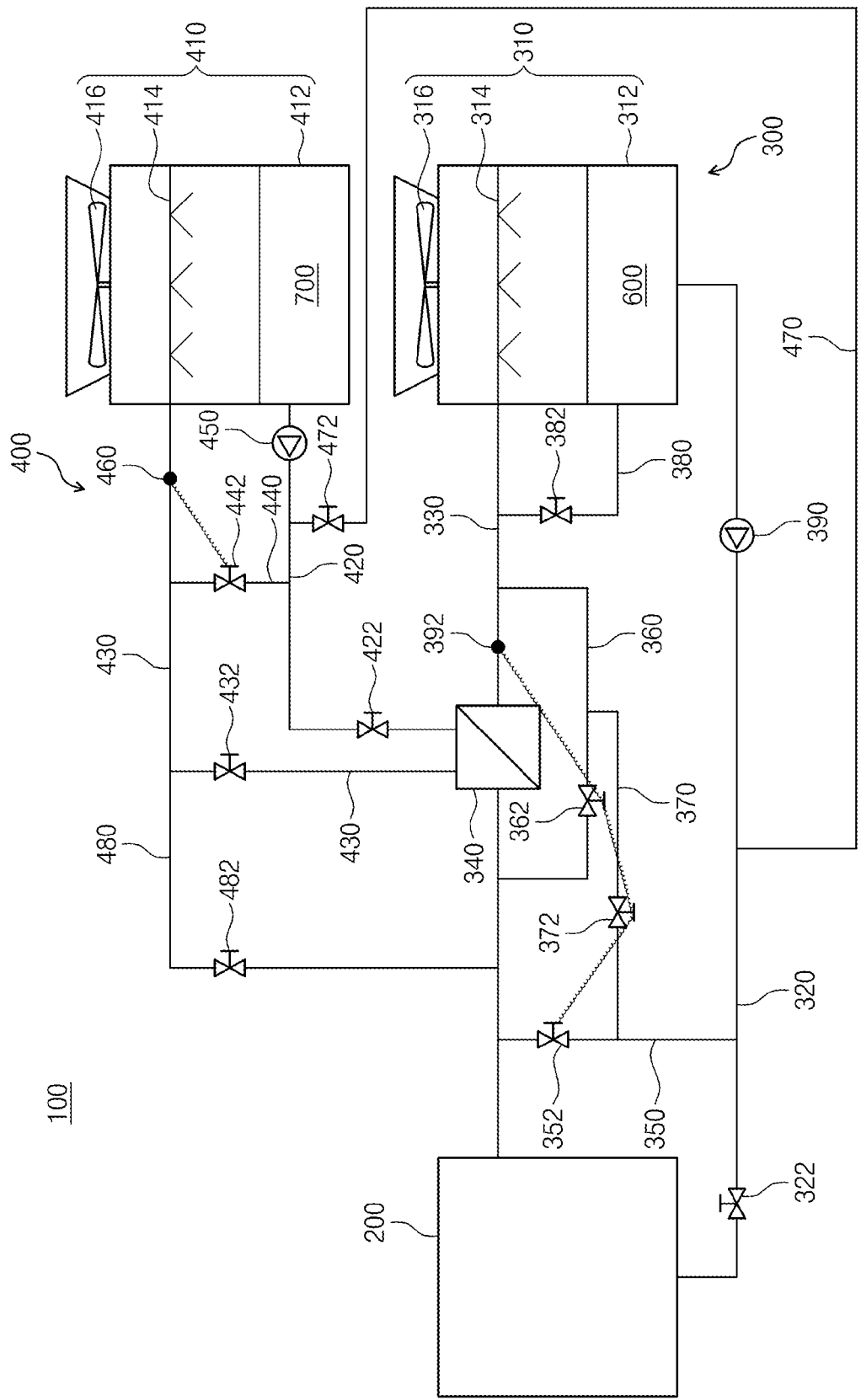
FIG. 3 is a view illustrating a cooling apparatus according to a first example embodiment.

FIG. 3 is a view illustrating a cooling apparatus according to a first example embodiment. A cooling apparatus 100 according to the first example embodiment may include a freezer 200, a first cooling unit 300, and a second cooling unit 400.

The first cooling unit 300 may supply first cooling water 600 to the freezer 200. The first cooling water 600 may be circulated between the first cooling unit 300 and the freezer 200. According to an example embodiment, the first cooling unit 300 may include a first cooling tower 310, a first cooling water supply line 320, a first cooling water collection line 330, a heat exchanger 340, a first cooling water bypass line 350, a heat exchanger bypass line 360, a double bypass line 370, a first cooling water sprinkler bypass line 380, a first cooling water pump 390, and a first temperature sensor 392.

The first cooling tower 310 may cool the first cooling water 600. According to an example embodiment, the first cooling tower 310 may include a first cooling water storage tank 312, a first cooling water sprinkler 314, and a first cooling fan 316. The first cooling water storage tank 312 stores the first cooling water 600. The first cooling water sprinkler 314 may sprinkle the first cooling water 600 over the first cooling water storage tank 312. The first cooling fan 316 may circulate air around the first cooling water sprinkler 314. The first cooling water 600 may be cooled in air.

The cooled first cooling water 600 may be supplied to the freezer 200 through the first cooling water supply line 320. The first cooling water supply line 320 connects the first cooling tower 310 and the freezer 200. The first cooling water pump 390 may be disposed on the first cooling water supply line 320. The first cooling water pump 390 may apply pressure for supplying the first cooling water 600. A first cooling water supply adjustment valve 322 may adjust flux of the first cooling water 600 supplied to the freezer 200.

The first cooling water collection line 330 may collect the first cooling water 600 from the freezer 200. The first cooling water collection line 330 connects the freezer 200 and the first cooling tower 310. The first cooling water 600 may be cooled by the heat exchanger 340.

The heat exchanger 340 may be disposed on the first cooling water collection line 330. The heat exchanger 340 may use second cooling water 700 as a refrigerant to cool the first cooling water 600. The second cooling water 700 may absorb heat of the first cooling water 600. The first cooling water 600 may be cooled in the heat exchanger 340 independently from the second cooling water 700.

The first cooling water 600 may be pre-cooled in the heat exchanger 340, and be re-cooled in the first cooling tower 310. The heat exchanger 340 may cool the first cooling water 600 such that the temperature of the first cooling water 600 has a temperature difference of, for example, less than about 12° C. from the temperature of the open air. White smoke of the first cooling water 600 in the first cooling tower 310 may be mitigated or prevented. According to some example embodiments, bypass flux of the first cooling water 600 may be reduced due to the existence of the heat exchanger 340. Thus, most of the cooled first cooling water 600 may be supplied to the freezer 200, thereby improving cooling efficiency of the freezer 200.

The first cooling water bypass line 350 may connect the first cooling water supply line 320 and the first cooling water collection line 330. A portion of the first cooling water 600 in the first cooling water supply line 320 may be supplied to the freezer 200, and a remainder of the first cooling waters 600 may bypass around the freezer 200 to be directly supplied to the first cooling water collection line 330 from the first cooling water supply line 320. The first cooling water bypass adjustment valve 352 may adjust the bypass flux of the first cooling water 600.

The heat exchanger bypass line 360 may allow the first cooling water 600 to bypass around the heat exchanger 340. The first cooling water 600 may not be cooled by the heat exchanger 340 and be supplied to the first cooling tower 310. According to an example embodiment, one end of the heat exchanger bypass line 360 may be branched from the first cooling water collection line 330 between the first cooling water bypass line 350 and the heat exchanger 340. The other end of the heat exchanger bypass line 360 may be re-connected to the first cooling water collection line 330 between the heat exchanger 340 and the first cooling tower 310. The heat exchanger bypass adjustment valve 362 may adjust flux of the first cooling water 600 in the heat exchanger bypass line 360. When the temperature of the first cooling water 600 has a temperature difference of, for example, less than about 12° C. from that of the open air, the first cooling water 600 may be supplied to the heat exchanger bypass line 360. Further, in the event that the first cooling water 600 is supplied to the heat exchanger 340 in excess of a cooling capability, the first cooling water 600 may be supplied to the heat exchanger bypass line 360.

The double bypass line 370 may connect the first cooling water bypass line 350 and the heat exchanger bypass line 360. The double bypass line 370 may mix the first cooling water 600 cooled in the first cooling tower 310 with the heated first cooling water 600 in the first heat exchanger bypass line 360. The mixed first cooling water 600 may have the temperature difference of, for example, less than about 12° C. from the open air.

The double bypass adjustment valve 372 may be disposed on the double bypass line 370. The double bypass adjustment valve 372 may adjust flux of the first cooling water 600 in the double bypass line 370. When the first cooling water 600 in the heat exchanger bypass line 360 has a temperature difference of, for example, more than about 12° C. from the open air, the cooled first cooling water 600 may be supplied to the heat exchanger bypass line 360 through the double bypass line 370. The first cooling water 600 in the heat exchanger bypass line 360 may have the temperature difference of, for example, less than about 12° C. from the open air.

The first temperature sensor 392 may be dispose on the first cooling water collection line 330. The first temperature sensor 392 may sense the temperature of the first cooling water 600. The first cooling water bypass adjustment valve 352, the heat exchanger bypass adjustment valve 362, and the double bypass adjustment valve 372 may be controlled in association with the first temperature sensor 392.

The first cooling water sprinkler bypass line 380 may connect the first cooling water collection line 330 and the first cooling water storage tank 312. When white smoke is generated in the first cooling water sprinkler 314, the first cooling water 600 may bypass around the first cooling water sprinkler 314 through the first cooling water sprinkler bypass line 380. For example, when the first cooling water 600 may be super-cooled in the heat exchanger 340, the first cooling water 600 may bypass around the first cooling water sprinkler 314. A first cooling water sprinkler bypass adjustment valve 382 may be disposed on the first cooling water sprinkler bypass line 380. The first cooling water sprinkler bypass adjustment valve 382 may adjust bypass sprinkle flux of the first cooling water 600.

The second cooling unit 400 may cool the second cooling water 700 and the first cooling water 600. According to an example embodiment, the second cooling unit 400 may include a second cooling tower 410, a second cooling water supply line 420, a second cooling water collection line 430, a second cooling water bypass line 440, and a second cooling water pump 450.

The second cooling tower 410 may cool the second cooling water 700. According to an example embodiment, the second cooling tower 410 may include a second cooling water storage tank 412, a second cooling water sprinkler 414, and a second cooling fan 416. The second cooling water 700 may be stored in the second cooling water storage tank 412. The second cooling water sprinkler 414 may sprinkle the second cooling water 700 over the second cooling water storage tank 412. The second cooling fan 416 may supply ambient air to the second cooling water storage tank 412 and the second cooling water sprinkler 414. The second cooling water 700 may be cooled in open air.

The second cooling water supply line 420 may connect the second cooling tower 410 and the heat exchanger 340. The second cooling water pump 450 may be disposed on the second cooling water supply line 420. The second cooling water pump 450 may supply pressure for supplying the second cooling water 700. A second cooling water supply adjustment valve 422 may be disposed on the second cooling water supply line 420. The second cooling water supply adjustment valve 422 may adjust flux of the second cooling water 700 supplied to the heat exchanger 340.

The second cooling water collection line 430 may connect the heat exchanger 340 and the second cooling tower 410. The second cooling water 700 may absorb heat of the first cooling water 600 in the heat exchanger 340. The heated second cooling water 700 may be supplied to the second cooling tower 410 through the second cooling water collection line 430. A second cooling water collection adjustment valve 432 may be disposed on the second cooling water collection line 430. The second cooling water collection adjustment valve 432 may adjust collection flux of the second cooling water 700 from the heat exchanger 340.

The second cooling water bypass line 440 may connect the second cooling water supply line 420 and the second cooling water collection line 430. For example, the second cooling water bypass line 440 may be connected from the second cooling water supply line 420 between the second cooling water pump 450 and the heat exchanger 340 to the second cooling water collection line 430.

A second cooling water bypass adjustment valve 442 may be disposed on the second cooling water bypass line 440. The second cooling water bypass adjustment valve 442 may adjust bypass flux of the second cooling water 700.

The second temperature sensor 460 may be disposed on the second cooling water collection line 430 between the second cooling water bypass line 440 and the second cooling tower 410. The second temperature sensor 460 may sense a temperature of the second cooling water 700 in the second cooling water collection line 430. The second cooling water bypass adjustment valve 442 may be controlled in association with the second temperature sensor 460. The second temperature sensor 460 and the second cooling water bypass adjustment valve 442 may control the temperature of the second cooling water 700. For example, the second cooling water 700 may be controlled to have a temperature difference of, for example, less than about 12° C. from the open air According to some example embodiments, the second temperature sensor 460 may sense a temperature of a mixture of the first cooling water 600 and second cooling water 700. The first cooling water 600 may be mixed with the second cooling water 700 in the second cooling water collection line 430. The second temperature sensor 460 and the second cooling water bypass adjustment valve 442 may control the temperature of the mixture of the mixed first cooling water 600 and the second cooling water 700 so that the mixture of the first cooling water 600 and the second cooling water 700 has a temperature difference of, for example, less than about 12° C. from the open air.

A first mix supply line 470 may supply the second cooling water 700 to the first cooling water supply line 320. The first mix supply line 470 may connect the second cooling water supply line 420 and the first cooling water supply line 320. One end of the first mix supply line 470 may be connected to the second cooling water supply line 420 between the second cooling water pump 450 and the second cooling water bypass line 440. The other end of the first mix supply line 470 may be connected to the first cooling water supply line 320 between the first cooling water pump 390 and the first cooling water bypass line 350. A first mix supply adjustment valve 472 may be disposed on the first mix supply line 470. The first mix supply adjustment valve 472 may adjust supply flux of the mixture of the first cooling water 600 and the second cooling water 700.

A first mix collection line 480 may supply the first cooling water 600 to the second cooling water collection line 430. The first mix collection line 480 may connect the first cooling water collection line 330 and the second cooling water collection line 430. One end of the first mix collection line 480 may be connected to the first cooling water collection line 330 between the first cooling water bypass line 350 and the heat exchanger bypass line 360. The other end of the first mix collection line 480 may be connected to the second cooling water collection line 430 between the heat exchanger 340 and the second cooling water bypass line 440. A first mix collection adjustment valve 482 may be disposed on the first mix collection line 480. The first mix collection adjustment valve 482 may adjust a mixed flux of the collected first cooling water 600 and second cooling water 700.

Meanwhile, the first cooling unit 300 and the second cooling unit 400 may operate differently according to air temperatures of the summer season and the winter season.

Hereinafter, a case of the summer season will be described. Open air in the summer season may have a temperature equal to or greater than room temperature of about 20° C. The first cooling unit 300 and the second cooling unit 400 may circulate the mixture of the first cooling water 600 and the second cooling water 700 to improve cooling efficiency of the freezer 200. The mixture of the first cooling water 600 and the second cooling water 700 may be supplied to the freezer 200 through the first mix supply line 470 and the first cooling water supply line 320. The mixture of the first cooling water 600 and the second cooling water 700 may be supplied to the first cooling tower 310 through the first cooling water collection line 330, and be supplied to the second cooling tower 410 through the first mix collection line 480 and the second cooling water collection line 430.

Hereinafter, a case of the winter season will be described. The first cooling unit 300 and the second cooling unit 400 may independently circulate the first cooling water 600 and the second cooling water 700 to mitigate or prevent white smoke in the first cooling tower 310. The open air in the winter season may have a temperature lower than room temperature of about 20° C. For example, the open air in the winter season may have a temperature of about 0° C.

Because the first cooling water 600 absorbs heat of the freezer 200 and is cooled by the open air, the first cooling water 600 collected from the freezer 200 may have a temperature higher than that of the open air. For example, a semiconductor manufacturing equipment having a relatively high temperature may be cooled to room temperature of about 20° C. by the first cooling water 600. The first cooling water 600 may be heated to room temperature or a temperature higher than room temperature while passing the freezer 200. The second cooling water 700 may have a temperature similar to that of the open air.

Because the second cooling water 700 absorbs heat of the first cooling water 600 in the heat exchanger 340, the first cooling water 600 may be cooled to a temperature higher than a temperature of, for example, about 0° C. of the open air and lower than room temperature of about 20° C. The first cooling water 600 may be re-cooled to a temperature similar to that of the open air in the first cooling tower 310. When a temperature difference between the first cooling water 600 and the open air is adjusted to, for example, less than about 12° C., white smoke may be mitigated or prevented in the first cooling tower 310. Similarly, when a temperature difference between the second cooling water 700 and the open air is adjusted to, for example, less than about 12° C., white smoke may be mitigated or prevented in the second cooling tower 410.

Figure 4:
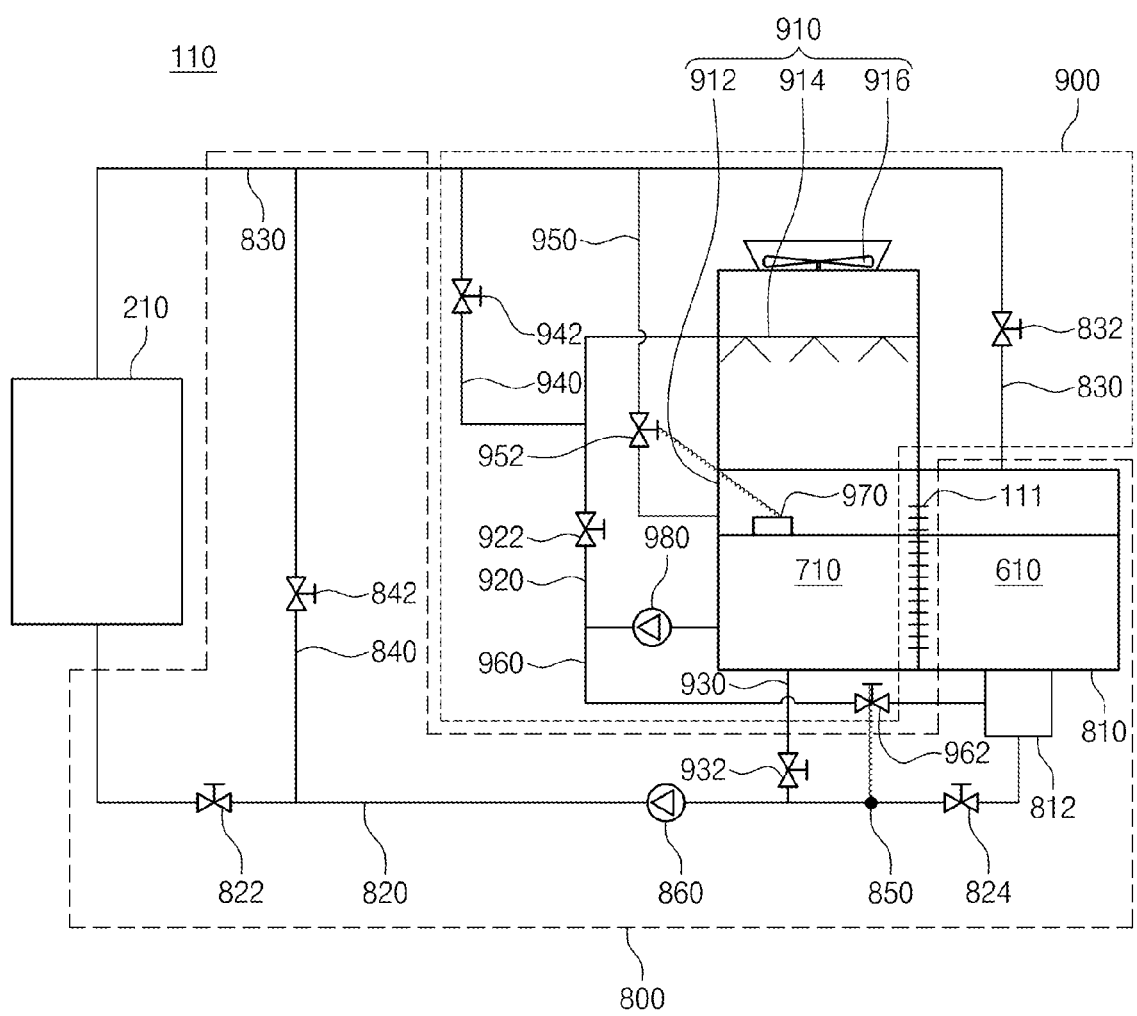
FIG. 4 is a view illustrating a cooling apparatus according to a second example embodiment.

FIG. 4 is a view illustrating a cooling apparatus 110 according to a second example embodiment. A cooling apparatus 110 according to the second example embodiment may include a freezer 210, a first cooling unit 800 and a second cooling unit 900. The second cooling unit 900 may mix first cooling water 610 with second cooling water 710 and cool the mixture of the first cooling water 610 and the second cooling water 710.

According to an example embodiment, the first cooling unit 800 may include a first cooling water storage tank 810, a first cooling water mixer 812, a first cooling water supply line 820, a first cooling water supply adjustment valve 822, a first cooling water mix adjustment valve 824, a first cooling water collection line 830, a first cooling water collection adjustment valve 832, a first cooling water bypass line 840, a first cooling water bypass adjustment valve 842, a first cooling water thermometer 850, and a first cooling water supply pump 860.

The first cooling water mixer 812 may be disposed between the first cooling water storage tank 810 and the first cooling water supply line 820. The first cooling water mixer 812 may mix the first cooling water 610 in the first cooling water storage tank 810 and the second cooling water 710 in the second cooling unit 900.

The first cooling water mix adjustment valve 824 may be disposed on the first cooling water supply line 820 between the first cooling water mixer 812 and the first cooling water supply pump 860. The first cooling water mix adjustment valve 824 may adjust the mixed flux of the first cooling water 610 and the second cooling water 710.

The first cooling water thermometer 850 may be disposed on the first cooling water supply line 820 between the first cooling water mix adjustment valve 824 and the first cooling water supply pump 860. The first cooling water thermometer 850 may measure a temperature of the first cooling water 610.

Because the first cooling water storage tank 800, the first cooling water supply line 820, the first cooling water supply adjustment valve 822, the first cooling water collection line 830, the first cooling water collection adjustment valve 832, the first cooling water bypass line 840, the first cooling water bypass adjustment valve 842 and the first cooling water supply pump 860 have the same functions as those in FIG. 3, descriptions for theses will be omitted.

The second cooling unit 900 may cool the second cooling water 710. The second cooling unit 900 may improve cooling efficiency of the freezer 210. According to an example embodiment, the second cooling unit 900 may include a second cooling tower 910, a second cooling water circulation line 920, a second mix supply line 930, a second mix supply adjustment valve 932, a second mix collection line 940, a second mix collection adjustment valve 942, an auxiliary mix collection line 950, an auxiliary mix collection adjustment valve 952, an auxiliary mix supply line 960, an auxiliary mix supply adjustment valve 962, a second cooling water level sensor 970, and a second cooling water pump 980.

The second cooling tower 910 may include a second cooling water storage tank 912, a second cooling water sprinkler 914, and a second cooling fan 916. The second cooling water storage tank 912 may temporarily store the second cooling water 710.

The second cooling water storage tank 912 may be disposed adjacent to the first cooling water storage tank 810. According to an example embodiment, the first cooling water storage tank 810 and the second cooling water storage tank 912 may be connected to each other through a heat sink plate 111. The second cooling water storage tank 912 and the first cooling water storage tank 810 may allow heat to be exchanged between the first cooling water 610 and the second cooling water 710. The first cooling water 610 may be cooled by the second cooling water 710. The second cooling water 710 may absorb heat of the first cooling water 610. The first cooling water 610 may be cooled to a temperature lower than room temperature. The cooled first cooling water 610 may be supplied to the freezer 210.

The second cooling water sprinkler 914 may sprinkle the second cooling water 710 over the open air on the second cooling water storage tank 912. The second cooling fan 916 may supply the open air to the second cooling water 710.

The second cooling water circulation line 920 may connect the second cooling water storage tank 912 and the second cooling water sprinkler 914. The second cooling water 710 may be circulated in the second cooling tower 910 through the second cooling water circulation line 920, and be cooled in the open air. A second cooling water circulation adjustment valve 922 may be disposed on the second cooling water circulation line 920. The second cooling water circulation adjustment valve 922 may adjust circulation flux of the second cooling water 710.

The second mix supply line 930 may supply the second cooling water 710 in the second cooling tower 910 to the first cooling water supply line 820. The second mix supply line 930 may connect the first cooling water supply line 820 between the first cooling water thermometer 850 and the first cooling water supply pump 860, and the second cooling water storage tank 912. The second mix supply adjustment valve 932 may be disposed on the second mix supply line 930. The second mix supply adjustment valve 932 may adjust a mix ratio of the first cooling water 610 and the second cooling water 710. When the second cooling water is increased, the cooling efficiency of the freezer 210 may be increased.

The second mix collection line 940 may supply the first cooling water 610 in the first cooling water collection line 830 to the second cooling water circulation line 920. The first cooling water 610 and the second cooling water 710 may be mixed with each other in the second cooling water circulation line 920 and the second cooling tower 910. The second mix collection line 940 may connect the first cooling water collection line 830 and the second cooling water circulation line 920. The second mix collection adjustment valve 942 may be disposed on the second mix collection line 940. The second mix collection adjustment valve 942 may adjust the mix ratio of the first cooling water 610 and the second cooling water 710.

The auxiliary mix collection line 950 may supply the first cooling water 610 in the first cooling water collection line 830 to the second cooling water storage tank 912. The auxiliary mix collection line 950 may connect the first cooling water collection line 830 and the second cooling water storage tank 912. The auxiliary mix collection adjustment valve 952 may be disposed on the auxiliary mix collection line 950. The auxiliary mix collection adjustment valve 952 may adjust a supplement amount of the first cooling water 610 with respect to the second cooling water storage tank 912.

The second cooling water level sensor 970 may sense a height of the second cooling water 710 in the second cooling water storage tank 912. The auxiliary mix collection adjustment valve 952 may be controlled by a level of the second cooling water 710 sensed by the second cooling water level sensor 970. When the level of the second cooling water 710 in the second cooling water storage tank 912 is lowered, the auxiliary mix collection adjustment valve 952 is opened so that the first cooling water 610 may be supplemented to the second cooling water storage tank 912.

The auxiliary mix supply line 960 may supply the second cooling water 710 in the second cooling water storage tank 912 to the first cooling water mixer 812. The second cooling water 710 may be pumped by the second cooling water pump 980. The auxiliary mix supply line 960 may connect the second cooling water circulation line 920 and the first cooling water mixer 812. The auxiliary mix supply adjustment valve 962 may be disposed on the auxiliary mix supply line 960. The auxiliary mix supply adjustment valve 962 may precisely adjust a mix ratio of the mixture of the first cooling water 610 and second cooling water 710 in the first cooling water mixer 812. The auxiliary mix supply adjustment valve 962 may be controlled by a temperature of the cooling water in the first cooling water thermometer 850.

In the summer season, the first cooling water 610 and the second cooling water 710 may be mixed with each other. The mixture of the first cooling water 610 and the second cooling water 710 may have a temperature difference of, for example, less than about 12° C. from the open air.

In the winter season, the first cooling water 610 and the second cooling water 710 may be independently circulated. Because the first cooling water 610 and the second cooling water 710 exchange heat through the heat sink plate 111 between the first cooling water storage tank 810 and the second cooling water storage tank 912, a temperature of the second cooling water may be controlled so as to have the temperature difference of, for example, less than about 12° C. from the temperature of the open air. Thus, a white smoke phenomenon of the second cooling water 710 may be mitigated or prevented.

Figure 5:
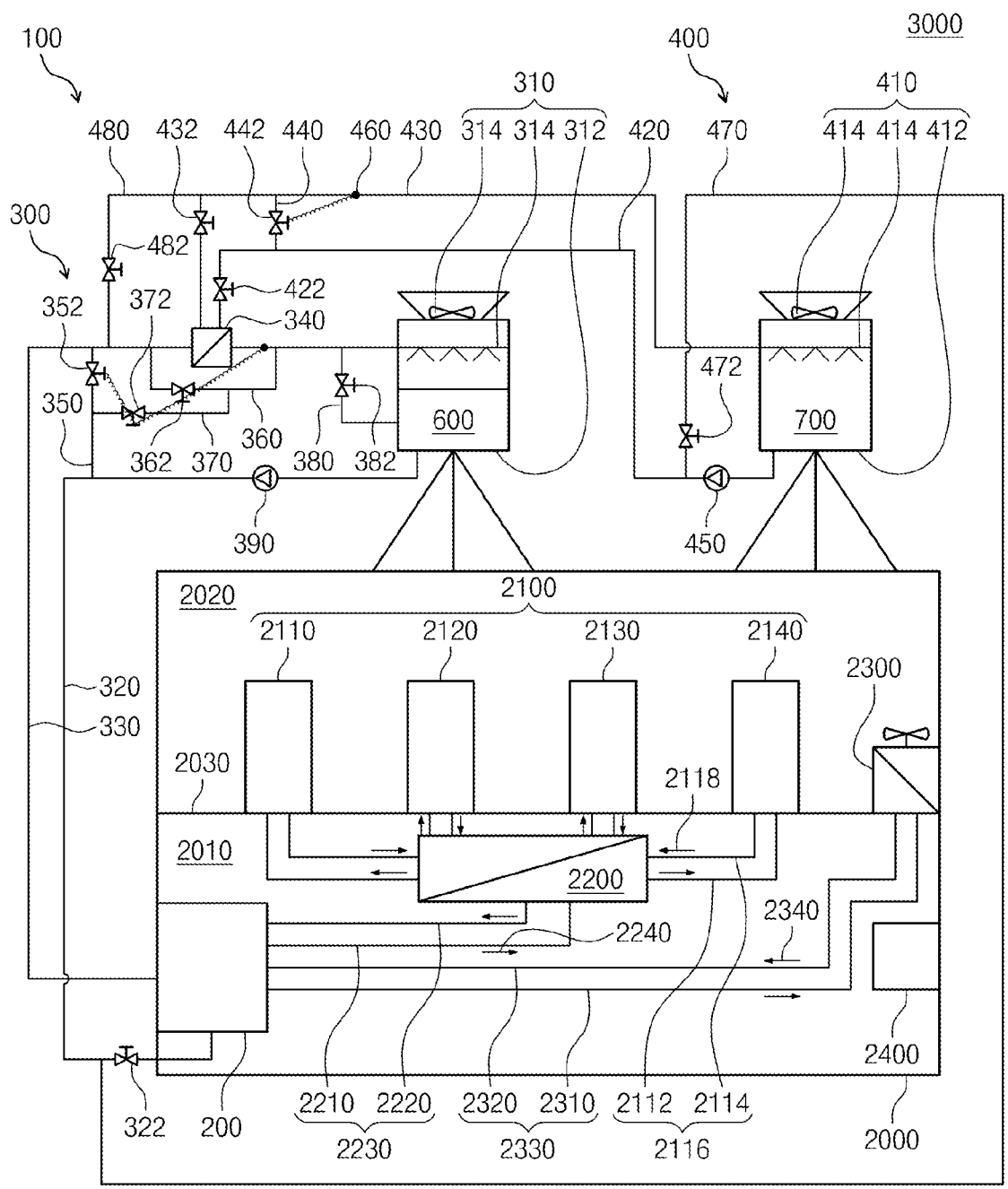
FIG. 5 is a view illustrating a semiconductor manufacturing system equipped with the cooling apparatus of FIG. 3, according to an example embodiment.

FIG. 5 is a view illustrating a semiconductor manufacturing system 3000 equipped with the cooling apparatus 100 of FIG. 3, according to an example embodiment. As shown in FIG. 3, the cooling apparatus 100 includes the first cooling unit 300 and the second cooling unit 400. The semiconductor manufacturing system 3000 may include a housing 2000, process equipment 2100, an apparatus cooling heat exchanger 2200, a room cooling heat exchanger 2300, a heater 2400 and the cooling apparatus 100.

The housing 2000 may protect the process equipment 2100. A temperature inside the housing 2000 may be controlled to room temperature of about 20° C. The housing 2000 may include a manufacturing factory producing and storing various products. According to an example embodiment, the housing may have a lower region 2010 and an upper region 2020. A bottom wall 2030 may be disposed between the lower region 2010 and the upper region 2020.

The process equipment 2100 may be disposed in the upper region 2020. The process equipment 2100 may be disposed on the bottom wall 2030. The process equipment 2100 may fabricate products. For example, the products may include semiconductor devices. The process equipment 2100 may include a first process equipment 2110, a second process equipment 2120, a third process equipment 2130, and a fourth equipment 2140. The first process equipment 2110 may include a light exposure device. The second process equipment 2120 may include an ion implantation device. The second process equipment 2130 may include a deposition device. The fourth process equipment 2140 may include an etching device. The process equipment 2100 may further include various kinds of devices. Most of the process equipment 2100 may perform semiconductor processes at a high temperature of, for example, about 100° C. to about 800° C. Process cooling water 2118 may cool an inside and an outside of the process equipment 2100. A temperature outside the housing 2100 may be controlled to room temperature of about 20° C. The process cooling water 2118 may absorb heat inside the process equipment 2100 and heat in the upper region 2020.

The apparatus cooling heat exchanger 2200 may be disposed in the lower region 2010. The apparatus cooling heat exchanger 2200 may supply the process cooling water 2118 to the process equipment 2100. The process cooling water 2118 may cool the process equipment 2100. The apparatus cooling heat exchanger 2200 may cool the process cooling water 2118 by using first chilled water 2240. The first chilled water 2240 may absorb heat of the process cooling water 2118.

Process cooling water circulation lines 2116 may connect the apparatus cooling heat exchanger 2200 and the process equipment 2100. The process cooling water 2118 may be circulated through the process cooling water circulation lines 2116. The process cooling water circulation lines 2116 may include a process cooling water supply line 2112 and a process cooling water collection line 2114.

The freezer 200 of the cooling apparatus 100 may be disposed in the lower region 2010. The freezer 200 may cool the first chilled water 2240.

First chilled water circulation lines 2230 may connect the freezer 200 and the apparatus cooling heat exchanger 2200. The first chilled water 2240 may be circulated through the first chilled water circulation lines 2230. The first chilled water circulation lines 2230 may include a first chilled water supply line 2210 and a second chilled collection line 2220.

The room cooling heat exchanger 2300 may be disposed on the bottom wall 2030. The room cooling heat exchanger 2300 may cool indoor air in the upper region 2020 by using second chilled water 2340.

Second chilled water circulation lines 2330 may connect the room cooling heat exchanger 2300 and the freezer 200. The second chilled water 2340 may be circulated through the second chilled water circulation lines 2330. The second chilled water circulation lines 2330 may include a second chilled water supply line 2310 and a second chilled collection line 2320.

The heater 2400 may be disposed in the lower region 2010. The heater 2400 may heat indoor air inside the housing 2000. The heated indoor air may be circulated in a whole inside of the housing through convection.

The first cooling tower 310 and the second cooling tower 410 may be disposed on the housing 2000. The cooling apparatus 100 may be constituted in the same manner as in FIG. 3, and white smoke on the housing 2000 may be mitigated or prevented.

Therefore, civil complaints from residents adjacent to the semiconductor manufacturing system 3000 may be reduced.

Figure 6:
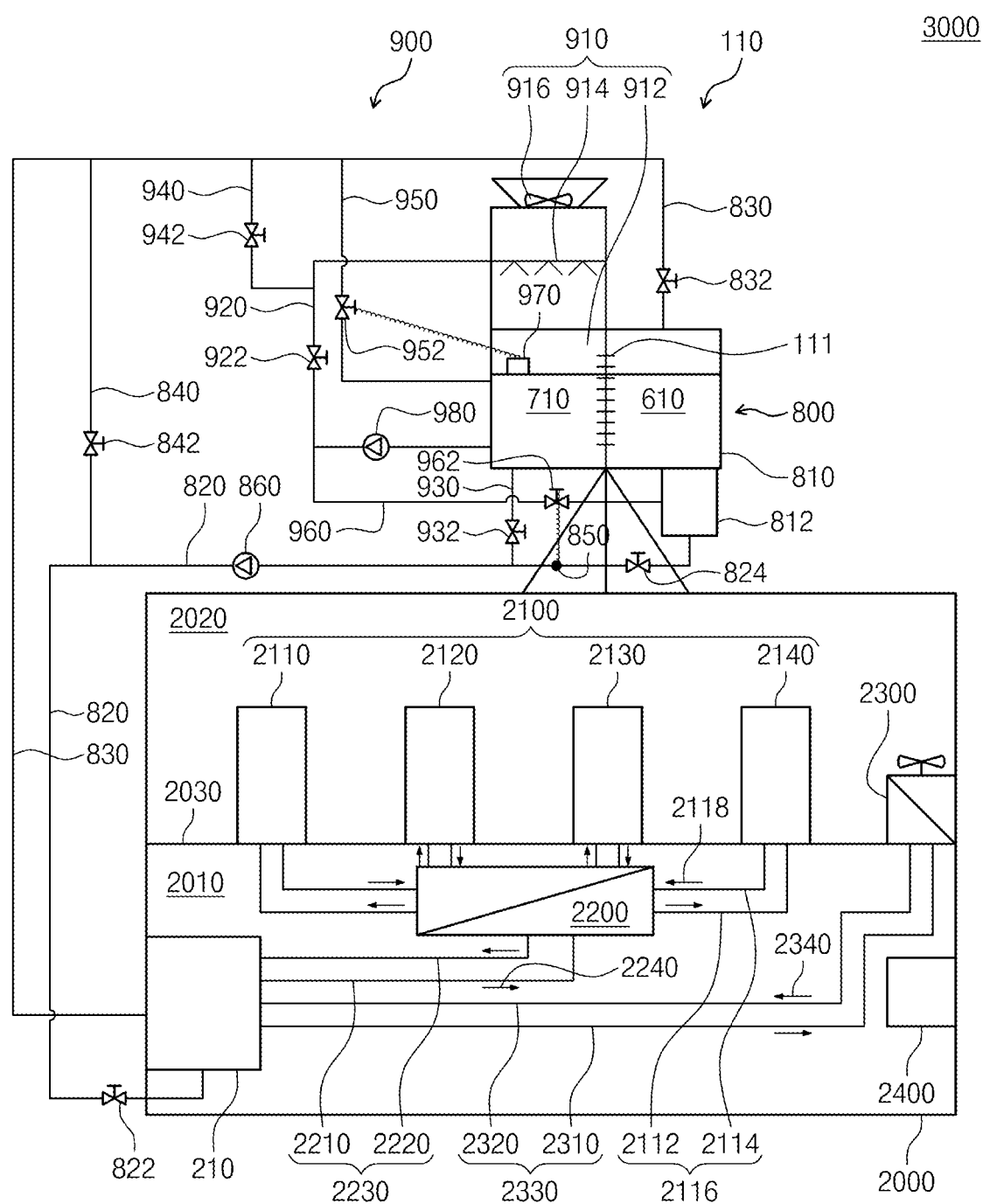
FIG. 6 is a view illustrating a semiconductor manufacturing system equipped with the cooling apparatus of FIG. 4, according to an example embodiment.

FIG. 6 is a view illustrating a semiconductor manufacturing system 3000 equipped with the cooling apparatus 110 of FIG. 4, according to an example embodiment. The first cooling water storage tank 810 and the second cooling tower 910 of the cooling apparatus 110 may be disposed on the housing 2000. The cooling apparatus 110 may have the same configuration as that in FIG. 4, and white smoke on the housing 2000 may be mitigated or prevented. A housing 2000, process equipment 2100, an apparatus cooling heat exchanger 200, a room cooling heat exchanger 2300, and a heater 2400 may have the same configurations as those in FIG. 5.

According to some example embodiments of the inventive concepts, the cooling apparatus may cool the first cooling water by using the second cooling water and then supply the cooled first cooling water to the open air to prevent the white smoke. In contrast with this, the cooling apparatus may supply the mixture of the first cooling water and the second cooling water to the freezer to improve cooling efficiency of the freezer.

The inventive concepts have been particularly shown and described with reference to some example embodiments thereof, while not limiting the inventive concepts, and may be used in various combinations, modifications and environments without departing from the spirit and cope of example embodiments defined by the following claims.

What is claimed is:

1. A cooling apparatus comprising:
   a freezer;
   a first cooling unit configured to cool first cooling water supplied to the freezer in open air; and
   a second cooling unit configured to cool second cooling water supplied to the first cooling unit,
   wherein according to a temperature difference between the open air and the first cooling water, the second cooling unit is configured to one of circulate the second cooling water independently from the first cooling water and mix the second cooling water with the first cooling water,
   the first cooling unit includes,
      a first cooling tower configured to cool the first cooling water,
      a first cooling water supply line and a first cooling water collection line between the first cooling tower and the freezer, the first cooling water supply line configured to supply the first cooling water, the first cooling water collection line configured to collect the first cooling water,
      a first cooling water bypass line between the first cooling water supply line and the first cooling water collection line, the first cooling water bypass line configured to bypass the freezer, and
      a heat exchanger on the first cooling water collection line and configured to cool the first cooling water by using the second cooling water, and
   the second cooling unit includes,
      a second cooling tower configured to cool the second cooling water to be supplied to the heat exchanger,
      a second cooling water supply line and a second cooling water collection line between the second cooling tower and the heat exchanger, the second cooling water supply line configured to supply the second cooling water, the second cooling water collection line configured to collect the second cooling water,
      a second cooling water bypass line between the second cooling water supply line and the second cooling water collection line, the second cooling water bypass line configured to bypass the heat exchanger,
      a first mix supply line configured to mix the second cooling water with the first cooling water to be supplied to the freezer, the first mix supply line branched from the second cooling water supply line between the second cooling tower and the second cooling water bypass line and connected to the first cooling water supply line between the first cooling tower and the first cooling water bypass line, and
      a first mix collection line configured to mix the first cooling water collected from the freezer into the second cooling water, the first mix collection line branched from the first cooling water collection line between the first cooling water bypass line and the heat exchanger and connected to the second cooling water collection line between the heat exchanger and the second cooling tower.

2. The cooling apparatus of claim 1, wherein
   the first cooling unit and the second cooling unit are configured to independently circulate the first cooling water and the second cooling water with respect to each other when the temperature difference between the open air and the first cooling water is equal to or greater than about 12° C., and
   the first cooling unit and the second cooling unit are configured to mix the first cooling water and the second cooling water with each other when the temperature difference between the open air and the first cooling water is equal to or less than about 12° C.

3. The cooling apparatus of claim 1, wherein the first cooling unit further comprises:
   a heat exchanger bypass line branched from the first cooling water collection line between the heat exchanger and the first cooling water bypass line, and again connected to the first cooling water collection line between the heat exchanger and the first cooling tower; and
   a double bypass line connecting the heat exchanger bypass line and the first cooling water bypass line, the double bypass line configured to bypass both freezer and the heat exchanger.

4. The cooling apparatus of claim 3, wherein the first cooling unit further comprises:
   a first cooling water bypass adjustment valve on the first cooling water bypass line;
   a heat exchanger bypass adjustment valve on the heat exchanger bypass line;
   a double bypass adjustment valve on the double bypass line; and
   a first temperature sensor on the first cooling water collection line between the heat exchanger and a position on the first cooling water collection line, the position being a point at which the heat exchanger bypass line is connected to the first cooling water collection line, the first temperature sensor configured to sense a temperature of the first cooling water,
   wherein the first cooling water bypass adjustment valve, the heat exchanger bypass adjustment valve, and the double bypass adjustment valve are configured to be controlled by the temperature of the first cooling water sensed by the first temperature sensor.

5. The cooling apparatus of claim 1, wherein the second cooling unit further comprises:
   a second cooling water bypass adjustment valve on the second cooling water bypass line, the second cooling water bypass adjustment valve configured to adjust a bypass flux of the second cooling water; and
   a second temperature sensor on the second cooling water collection line between the second cooling water bypass line and the second cooling tower, the second temperature sensor configured to sense a temperature of the second cooling water,
   wherein the second cooling water bypass adjustment valve is configured to be controlled by a temperature of the second cooling water sensed by the second temperature sensor.

6. The cooling apparatus of claim 1, wherein the first cooling tower comprises:
   a first cooling water storage tank configured to store the first cooling water; and
   a first cooling water sprinkler connected to the first cooling water collection line and configured to sprinkle the first cooling water on the first cooling water storage tank.

7. The cooling apparatus of claim 6, wherein the first cooling unit further comprises a first cooling water sprinkler bypass line configured to bypass the first cooling water sprinkler by connecting the first cooling water collection line to the first cooling water storage tank.

8. The cooling apparatus of claim 1, wherein
the first cooling unit comprises
a first cooling water storage tank configured to store the first cooling water, and
a first cooling water supply line and a first cooling water collection line between the first cooling water storage tank and the freezer, the first cooling water supply line configured to supply the first cooling water, the first cooling water collection line configured to collect the first cooling water, and
the second cooling unit comprises
a second cooling tower including
a second cooling water storage tank configured to store the second cooling water, and
a cooling water sprinkler configured to sprinkle the second cooling water on the second cooling water storage tank, and
a second cooling water circulation line between the second cooling water storage tank and the cooling water sprinkler, and the second cooling water circulation line configured to circulate the second cooling water therebetween,
wherein the first cooling water storage tank and the second cooling water storage tank are connected to each other through a heat sink plate interposed therebetween.

9. The cooling apparatus of claim 8, wherein the second cooling unit further comprises:
a second mix collection line between the first cooling water collection line and the second cooling water storage tank, the second mix collection line configured to supply the first cooling water in the first cooling water collection line to the second cooling water circulation line;
a second mix collection adjustment valve on the second mix collection line and configured to adjust a mixed flux of the first cooling water and the second cooling water;
a second mix supply line between the second cooling water storage tank and the first cooling water supply line and configured to supply the second cooling water in the second cooling tower to the first cooling water supply line; and
a second supply adjustment valve on the second mix supply line and configured to adjust a supply flux of the first cooling water and the second cooling water.

10. A cooling apparatus comprising:
a freezer;
a first cooling unit configured to cool first cooling water supplied to the freezer in open air; and
a second cooling unit configured to cool second cooling water supplied to the first cooling unit, the second cooling unit configured to one of exchange heat between the first cooling water and the second cooling water in an unmixed manner, and mix the second cooling water with the first cooling water based on a temperature difference between the open air and the first cooling water,
wherein the first cooling unit includes,
a first cooling tower configured to cool the first cooling water,
a first cooling water supply line and a first cooling water collection line between the first cooling tower and the freezer, the first cooling water supply line configured to supply the first cooling water, the first cooling water collection line configured to collect the first cooling water,
a first cooling water bypass line between the first cooling water supply line and the first cooling water collection line, the first cooling water bypass line configured to bypass the freezer, and
a heat exchanger on the first cooling water collection line and configured to cool the first cooling water by using the second cooling water, and
the second cooling unit includes,
a second cooling tower configured to cool the second cooling water to be supplied to the heat exchanger,
a second cooling water supply line and a second cooling water collection line between the second cooling tower and the heat exchanger, the second cooling water supply line configured to supply the second cooling water, the second cooling water collection line configured to collect the second cooling water,
a second cooling water bypass line between the second cooling water supply line and the second cooling water collection line, the second cooling water bypass line configured to bypass the heat exchanger,
a first mix supply line configured to mix the second cooling water with the first cooling water to be supplied to the freezer, the first mix supply line branched from the second cooling water supply line between the second cooling tower and the second cooling water bypass line and connected to the first cooling water supply line between the first cooling tower and the first cooling water bypass line, and
a first mix collection line configured to mix the first cooling water collected from the freezer into the second cooling water, the first mix collection line branched from the first cooling water collection line between the first cooling water bypass line and the heat exchanger and connected to the second cooling water collection line between the heat exchanger and the second cooling tower.

11. The cooling apparatus of claim 10, wherein the second cooling unit is further configured to mix the first cooling water and the second cooling water when the temperature difference is equal to or less than a temperature value.

12. The cooling apparatus of claim 10, wherein the heat exchanger is further configured to cool the first cooling water by exchanging heat between the first cooling water and the second cooling water.

13. The cooling apparatus of claim 10, wherein the first cooling unit includes a first cooling tower having a first cooling water storage tank, the second cooling unit includes a second cooling tower having a second cooling water storage tank, and the first cooling water storage tank and the second cooling water storage tank are configured to exchange heat through a heat sink plate therebetween.

* * * * *